M. G. McGUIRE.
SPORTSMAN'S APPLIANCE.
APPLICATION FILED JULY 13, 1910. RENEWED AUG. 9, 1911.
1,020,044.
Patented Mar. 12, 1912.
2 SHEETS—SHEET 1.
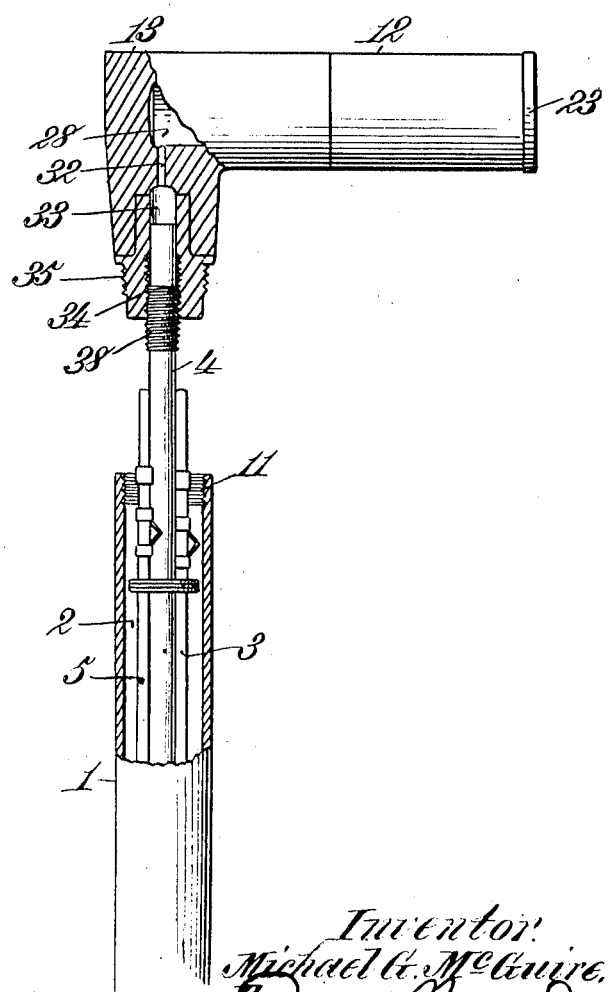

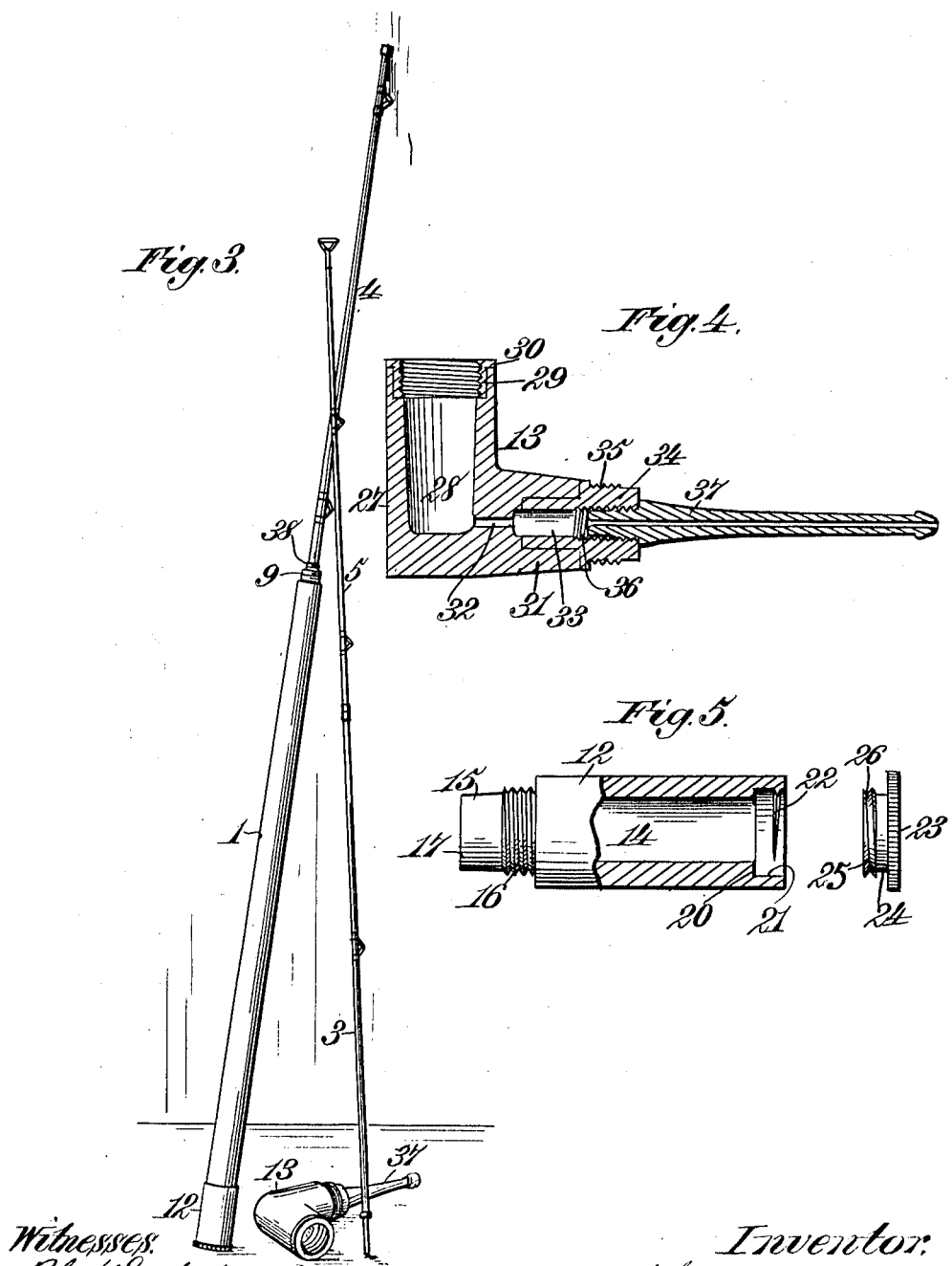

UNITED STATES PATENT OFFICE.

MICHAEL G. McGUIRE, OF CHICAGO, ILLINOIS.

SPORTSMAN'S APPLIANCE.

1,020,044.  Specification of Letters Patent.   Patented Mar. 12, 1912.

Application filed July 13, 1910, Serial No. 571,771.  Renewed August 9, 1911. Serial No. 643,217.

*To all whom it may concern:*

Be it known that I, MICHAEL G. McGUIRE, a citizen of the United States, residing at Chicago, in the county of Cook and State of Illinois, have invented new and useful Improvements in Sportsmen's Appliances, of which the following is a specification.

This invention relates to a sportsman's appliance, particularly adapted for the use of anglers; and the object thereof is to provide an appliance for the use of anglers which, when assembled, embodies the function of a cane, and also constitutes a sheath for housing the sections of a fishing rod and other articles.

A further object of the invention is to provide an appliance for the use of anglers embodying a housing or case for the sections of a fishing rod and further embodying means for facilitating the withdrawal of the fishing rod sections from their sheath or case.

A still further object of the invention is to provide an appliance for the use of anglers embodying means forming a part of the handle of the appliance and constituting a pipe bowl, and further embodying means forming a part of the handle of the appliance and constituting a receptacle for matches or other articles, the receptacle extending into the pipe bowl for reinforcing the same to prevent collapsing of the handle.

With the foregoing and other objects in view, the invention comprehends the novel construction, combination and arrangement of parts hereinafter more specifically described and illustrated in the accompanying drawings, wherein is shown the preferred embodiment of the invention.

In the accompanying drawings, wherein like reference characters denote corresponding parts throughout the several views, Figure 1 is a longitudinal sectional view of the complete appliance. Fig. 2 is an enlarged detail sectional view of the handle of the appliance, showing the joint between the handle, the sheath, and the main section of the fishing rod. Fig. 3 is a perspective view showing the sheath with a section of the fishing rod connected thereto, and also showing the match receptacle secured to the lower end of the sheath, as well as a pipe stem secured to that section of the handle which forms the pipe bowl. Fig. 4 is a longitudinal sectional view of the pipe. Fig. 5 is a sectional side elevation of the match receptacle, showing the closure for the same disconnected therefrom.

Referring to the drawings in detail, 1 denotes the body portion of the appliance, which is in the form of an elongated tapering tube and which will be hereinafter termed the sheath. The bore 2 of the sheath is adapted to receive the sections of a fishing rod, indicated by the reference characters 3, 4 and 5, and opens at its lower end into a passage 6 formed through the solid lower end 7 of the sheath, a portion of this passage being threaded interiorly, as at 8. The said lower end 7 of the sheath is also formed with exterior threads 9, to admit of the removable engagement of a ferrule 10 therewith, while the upper end of the sheath is interiorly screw-threaded, as at 11.

The handle portion of the appliance comprises two sections 12 and 13. The section 12 is formed with a recess 14 constituting a receptacle for matches or other articles, and said section is also formed at one end with a dowel extension 15 which is peripherally threaded as at 16 and has a tapering end 17. The dowel 15 is of less diameter throughout than the section 12, and is provided with a longitudinal recess or socket 18, the outer portion of which is interiorly threaded, as at 19. The inner face of the outer end of section 12 is cut away to form a shoulder 20 and a portion 21 of greater diameter. The said portion 21 is provided with a straight thread 22 tapered at both ends, the length of the thread being less than the diameter of the portion 21 on which it is formed. This section is closed through the medium of a disk 23 having a protuberance projecting inwardly therefrom, the protuberance embodying portions of two different diameters, the portion of smaller diameter being indicated by the reference numeral 25, and the portion of larger diameter by the reference numeral 25. The portion 25 constitutes what may be termed a locking flange for the disk 23, and its periphery is formed with an inclined groove 26 of less diameter than the diameter of said portion 25. The thread 22 is adapted to pass through the groove 26 and be positioned back of the inner face of the portion 25, thereby maintaining the disk connected to section 12. When securing the disk in position, it is turned in one direction until the thread 22 passes clear of the groove 26 and is then turned in the opposite direction. This positions the thread against the outer face of the enlarged portion 25 and securely retains said disk in closed position.

The section 13 of the handle of the appliance is substantially L-shaped in contour, and the part 27 of said section, which extends in a horizontal plane when the sections of the handle are secured together in a manner shown in Fig. 1, is provided with a recess 28 so as to admit of its being utilized as a pipe bowl. The wall of this recess tapers outwardly at its open end and is slightly cut away to provide a seat for a screw-threaded collar 29, said collar having at its outer end an annular flange 30 which fits flush against the outer edge of the bowl. The other part 31 of section 13 is provided with a passage 32, which communicates with the lower portion of the recess 28, and also with a socket 33 that is formed through a dowel extension 34 on part 31 and partway through said part 31. The side wall of dowel 34 is provided with external threads 35, and the outer portion of the socket 33 with threads 36, said socket being identical in its dimensions with the threaded socket 18 in handle section 12. The two dowels 15 and 34 are likewise of the same diameter, the threads 35 on dowel 34 being of the same size and pitch as the threads 16 on dowel 15. Either of these dowels may be engaged in the threaded upper end of sheath 1, as will be explained hereinafter, the diameter of the dowels being such as to enable them to fit therein. The threaded portion of socket 33 is adapted to receive the similarly threaded end of the mouth piece 37, the said mouth piece being disposed in the lower end of the sheath bore 2, when not in use.

When the sections of the handle are secured together, the threaded cylindrical portion 16 of the dowel extension 15 engages with the collar 29, and the tapering portion 16 of said dowel extension engages the tapering portion of the wall of the recess 28. This manner of setting up the sections 12 and 13 is clearly shown in Fig. 1, and it is evident that the dowel extension 15 thus reinforces what may be termed the pipe bowl section of the handle, so as to prevent the same from collapsing.

The section 4 of the fishing rod is formed at its upper end with threads 38, said threads being spaced from the terminal of the section end, however, as shown in Figs. 1 and 2. The portion of said section whereon these threads are provided is of such a size as to be received in either of the threaded sockets 18 or 33. Consequently, it will be apparent that said section may be readily connected to either section of the handle, and that section then attached to the sheath by screwing its dowel into the threaded upper end of the sheath, the rod section being previously inserted, together with the other two sections 3 and 5, which may be strapped or otherwise suitably secured thereto, into said sheath. During the screwing of the handle section into the sheath end, the connection of the rod sections together and the attachment of the section 4 to the handle section will prevent independent or individual movement of said rod sections, thus precluding injury to the line eyes, and to the line itself, if retained on the rod. It will be equally apparent that when the handle is unscrewed from the sheath, and withdrawn, the rod sections will be carried with it. When the rod is to be used, its sections may be connected together in the ordinary manner, and the threaded end then engaged directly with either handle section, or in the threaded socket 6 at the lower end of the sheath, according to whether a short or long rod is desired. Also, the pipe may be utilized, if its bowl part 13 is not in use, by removing the stem or mouth-piece 37 from the sheath and attaching it to the bowl. The pipe may, moreover, be used with equal facility when the rod is not being used, since the rod sections may be readily attached to the receptacle, and the latter attached to the threaded sheath end. Finally, it will be apparent that the appliance may be utilized as a cane, irrespective of whether or not the rod sections are suspended therein, and the pipe is in use.

I claim as my invention:—

1. A combined cane, pipe and fishing rod comprising, in combination, a sheath, a detachable handle therefor composed of a pair of separably connected sections provided with dowels for interchangeable engagement in the upper end of the sheath, one of said sections constituting a pipe bowl, the other section having an article containing recess formed therein and having its dowel closely fitting in said bowl to reinforce the latter, and a disk detachably connected to the second-named section for closing said recess.

2. A combined cane, pipe and fishing rod comprising, in combination, a sheath, a detachable handle therefor composed of a pair of separably connected sections provided with dowels for interchangeable engagement in the upper end of the sheath, one of said sections having formed therein a recess of the same diameter as the dowel of the other section, in which recess the last-mentioned dowel closely fits throughout its entire extent, for reinforcing said recessed section.

3. A combined cane, pipe and fishing rod comprising, in combination, a sheath, a detachable handle therefor composed of a pair of separably connected sections provided with dowels for interchangeable engagement in the upper end of the sheath, each dowel having a socket formed therein, one of said sections being formed with a recess wherein the dowel of the other section closely fits, for reinforcing the recessed section, and a member disposed within said sheath and provided with means for interchangeable engagement in said sockets.

4. A combined cane, pipe and fishing rod comprising, in combination, a sheath, having its upper end interiorly threaded and its lower end formed with a threaded socket, a detachable handle for the sheath composed of a pair of separably connected sections provided with threaded dowels for interchangeable engagement in the upper end of the sheath, each dowel having a threaded socket formed therein, and a member disposed within said sheath and having a threaded end for interchangeable engagement in all of said sockets.

5. A combined cane, pipe and fishing rod comprising, in combination, a sheath having its upper end interiorly threaded and its lower end formed with a threaded socket, a detachable handle for the sheath composed of a pair of separably connected sections provided with threaded dowels for interchangeable engagement in the upper end of the sheath, each dowel having a threaded socket formed therein, one of said sections being formed with a recess wherein the dowel of the other section closely fits, for reinforcing the recessed section, and a member disposed within said sheath and having a threaded end for interchangeable engagement in all of said sockets.

In testimony whereof I have hereunto set my hand in presence of two subscribing witnesses.

MICHAEL G. McGUIRE.

Witnesses:
CHAS. S. HYER,
M. E. McDADE.